United States Patent [19]

Nakashima et al.

[11] Patent Number: 5,126,143
[45] Date of Patent: Jun. 30, 1992

[54] BOWEL MOVEMENT-IMPROVING FOOD PRODUCTS

[75] Inventors: Hiroshi Nakashima; Takuji Gotoh, both of Yamanashi, Japan

[73] Assignee: Terumo Kabushiki Kaisha, Tokyo, Japan

[21] Appl. No.: 445,651

[22] PCT Filed: Apr. 25, 1988

[86] PCT No.: PCT/JP88/00399
§ 371 Date: Dec. 6, 1989
§ 102(e) Date: Dec. 6, 1989

[87] PCT Pub. No.: WO88/08257
PCT Pub. Date: Nov. 3, 1988

[30] Foreign Application Priority Data

| Apr. 25, 1987 | [JP] | Japan | 62-101150 |
| Apr. 25, 1987 | [JP] | Japan | 62-101151 |
| Dec. 17, 1987 | [JP] | Japan | 62-317327 |

[51] Int. Cl.$^5$ .............. A61K 47/26; A23L 1/00; A23L 1/0524
[52] U.S. Cl. .............. 424/439; 424/195.1; 424/441; 424/489; 424/499; 426/531; 426/618; 426/658; 514/777; 514/892
[58] Field of Search .............. 424/439, 441; 536/1.1; 514/777, 892; 426/658

[56] References Cited

U.S. PATENT DOCUMENTS

| 3,766,165 | 10/1973 | Lyme | 536/1.1 |
| 4,042,714 | 8/1977 | Torres | 426/62 |
| 4,143,163 | 3/1979 | Hutchison et al. | 426/96 |
| 4,766,004 | 8/1988 | Moskowitz | 424/439 |
| 4,777,045 | 10/1988 | Vanderveer et al. | 424/439 |
| 4,784,861 | 11/1988 | Gori | 424/439 |
| 4,833,128 | 5/1989 | Solomon et al. | 424/439 |
| 4,859,488 | 8/1989 | Kan et al. | 536/123 |

FOREIGN PATENT DOCUMENTS

| 0166824 | 1/1986 | European Pat. Off. |
| 0166825 | 1/1986 | European Pat. Off. |
| 57-36947 | 2/1982 | Japan |
| 57-74072 | 5/1982 | Japan |
| 60-262572 | 12/1985 | Japan |
| 60-262573 | 12/1985 | Japan |

*Primary Examiner*—Thurman K. Page
*Assistant Examiner*—James M. Spear
*Attorney, Agent, or Firm*—Burns, Doane, Swecker & Mathis

[57] ABSTRACT

Bowel movement-improving food products incorporating dietary fibers in total amount of 10 to 50% by weight based on the whole products, said dietary fibers comprising hardly water-soluble dietary fibers and readily water-soluble dietary fibers at a ratio of 1:2–30 parts by weight and 10% by weight or more of the former being hemicellulose. The food products of the invention are useful for preventing and treating constipation of both proctosenous and colonic types.

6 Claims, No Drawings

BOWEL MOVEMENT-IMPROVING FOOD PRODUCTS

TECHNICAL FIELD

The present invention relates to bowel movement-improving food products. More particularly, it is concerned with bowel movement-improving food products comprising hardly water-soluble dietary fibers and readily water-soluble dietary fibers at a specific ratio.

The food products of the invention are useful for preventing and treating constipation of both proctosenous and colonic types.

BACKGROUND ART

In recent years a variety of food products in which dietary fibers effective for improving bowel movements and preventing adult diseases are incorporated are available on the market. The dietary fibers incorporated in such food products are mainly composed of hardly water-soluble dietary fibers. Hardly water-soluble dietary fibers mostly pass through the digestive tracts without being digested and absorbed, inducing increased amount of stools, so that the rectum is physically stimulated to increase a desire to defecate and the stools are softened to improve bowel movement. They are therefore effective in proctosenous constipation.

Constipation, however, is frequently of mixed type of proctosenous and colonic ones. For the colonic type of constipation (atonic) with reduced peristalsis, readily water-soluble fibers are more effective, because they are hydrolyzed in the lower digestive tracts by intestinal microorganisms and the hydrolysis products, organic acids, activate peristalsis of digestive tracts thereby accelerating defecation although they are not hydrolyzed by human digestive enzymes.

Therefore, it is desirable to take both of the hardly water-soluble dietary fibers and the readily water-soluble dietary fibers for effectively preventing or curing constipation.

Japanese Patent Application Laid-Open-to-Public No. 262572/1985 discloses food products comprising hardly water-soluble dietary fibers coated with readily water-soluble dietary fibers. However, because of low contents of the readily water-soluble fibers in such food products, they are not effective in colonic constipation.

Approximately two third of the fecal amount is water and the water content is especially dependent upon undigested food, especially the content of dietary fibers. Therefore, ingestion of the hardly water-soluble dietary fibers of high water-retention more effectively increases the amount and water content of stools.

DISCLOSURE OF THE INVENTION

According to the present invention, there are provided bowel movement-improving food products as set forth below.

1) A bowel movement-improving food product containing 10-50% by weight of dietary fibers based upon the whole product wherein said dietary fibers comprises hardly water-soluble dietary fibers and readily water-soluble dietary fibers, 2-30 parts by weight of the readily water-soluble dietary fibers are contained per part by weight of the hardly water-soluble dietary fibers and 10% by weight or more of the hardly water-soluble dietary fibers is hemicellulose.

2) A bowel movement-improving food product according to item 1 wherein the hemicellulose is a dietary fiber obtained from corn, cabbage or carrot.

3) A bowel movement-improving food product according to item 1 wherein the readily water-soluble dietary fibers are polysaccharide capable of being hydrolyzed by human intestinal microorganisms.

4) A bowel movement-improving food product according to item 3 wherein the polysaccharide is a combination of one or more members selected from the group consisting of polydextrose, pullulan and gum arabic and one or more members selected from the group consisting of pectin, guar gum, sodium alginate, carrageenan, glucomannan, Locust bean gum, tamarind gum and gum tragacanth.

5) A bowel movement-improving food product according to item 1 wherein the product is in flake form.

6) A bowel movement-improving food product according to item 1 wherein the product is in stew form.

7) A bowel movement-improving food product according to item 1 wherein the product is in rice gruel form.

8) A bowel movement-improving food product according to item 1 wherein the product is in wafer form.

9) A method for improving bowel movement which comprises administering to patients a bowel movement-improving food product at a daily dose of 5-25 g in adults in terms of the total amount of dietary fibers.

"Dietary fibers" as herein referred to mean the macromolecular compounds in food which are not digested with human digestive enzymes, including both vegetable and animal fibers.

Content of the dietary fibers is in the range of 10 to 50% by weight based on the total product. The content below 10% by weight cannot expect the bowel movement-improving effect, and the content beyond 50% by weight makes texture so poor that the product is not suitable as food.

Among the dietary fibers, those which are hardly soluble in water mostly pass through the digestive tracts without being digested and absorbed, inducing increased amount of stools, so that the rectum is physically stimulated to increase a desire to defacate and the stools are softened to improve bowel movement. They are therefore effective in proctosenous constipation. Cellulose, lignin, hemicellulose and the like are dietary fibers of such type.

Usually, about two third of the fecal amount is water and the water content is especially dependent upon undigested food, especially the content of dietary fibers. Thus, ingestion of the hardly water-soluble dietary fibers of high water-retention more effectively increase the amount and water content of stools.

From the viewpoint of water retentivity, hardly water-soluble dietary fibers entirely composed of cellulose are less desirable than those which contain 10% by weight or more of hemicellulose. Hemicellulose is a polysaccharide constructing the cell walls of land plants other than cellulose and pectinic substances. The dietary fibers hardly soluble in water and containing 10% by weight or more of hemicellulose have a large number of side chains, are amorphous and, as observed under electronic microscope, have a porous structure containing a large number of perforations and wall openings. They are distinguished from cellulose and are known to exert a higher water retentivity. In addition, hemicellulose has an activity of inhibiting absorption of cholesterol into the body due to its adsorption of the cholesterol in digested food.

The hardly water-soluble dietary fibers employed in the present invention should contain 10% by weight or more, preferably 20% by weight or more of hemicellulose rather than being composed of pure cellulose. Dietary fibers of, for example, corn, cabbage, carrot or the like which contain 20% by weight or more of hemicellulose are especially preferable.

If hemicellulose content in the hardly water-soluble dietary fibers is below 10% by weight, water retentivity of stools will be weaker and increase in the amount of stools will not be sufficient.

As described above, readily water-soluble dietary fibers are not hydrolyzed with human digestive enzymes but are hydrolyzed in the lower digestive tracts by intestinal microorganisms and the hydrolysis products, organic acids, activate peristalsis of digestive tracts thereby accelerating defecation. Therefore, they are effective in colonic constipation. Polydextrose, pullulan, gum arabic tamarind gum, pectin, guar gum, glucomannan and the like are dietary fibers of such type.

In addition, the readily water-soluble dietary fibers have serum cholesterol-lowering activity and postmeal blood sugar increase inhibitory activity.

Decomposition rate (utilization rate) of readily water-soluble dietary fibers by intestinal microorganisms is 100% for pectin, glucomannan or the like and approximately 50% for polydextrose. In the latter case, the rest is excreted into stools.

There exist large individual variations in the constitution of intestinal microbial flora. It is also variable depending upon age of the subject and contents of the meal. Therefore, capacity of the microbial flora to decompose one and the same readily water soluble dietary fibers is different person by person.

In this respect, incorporation of readily water-soluble dietary fibers in combination with plural kinds of fibers which are different in origin and structure would permit better improvement in bowel movement.

Some of the readily water-soluble dietary fibers are highly viscous so that they are liable to be gelled in the mouth and be attached to teeth thereby giving very poor texture. Such a problem would be solved when dietary fibers of low viscosity and dietary fibers of high viscosity are combined.

Dietary fibers of low viscosity, as referred to herein, are the dietary fibers having a viscosity below 5 cP in a concentration of 1% at 37° C., which include, for example, polydextrose (2 cP or lower) pullulan (1–2 cP) and gum arabic (1–2 cP).

Dietary fibers of high viscosity mean dietary fibers having a viscosity of 5 cP or higher in a concentration of 1% at 37° C. As examples of them are mentioned guar gum (>2000 cP), pectin (9 cP), sodium alginate (153 cP), carrageenan (>50 cP), glucomannan (>2000 cP), Locust bean gum (>2000 cP), tamarind gum (30 cP) and gum tragacanth (127 cP).

Dietary fiber compositions of good texture can be prepared by combining one or more kinds of the low-viscosity dietary fibers and one or more kinds of the high-viscosity dietary fibers.

When polydextrose of good texture and easily decomposable water-soluble dietary fibers of poor texture but decomposable by any person are mixed, there can be produced food products of good texture from which organic acids are formed in any person. Mixture of the two of which $\frac{1}{2}$-182 is polydextrose and the rest is easily decomposable water-soluble dietary fibers are preferable. Especially preferable are mixtures of which approximately $\frac{2}{3}$ is the former and approximately $\frac{1}{3}$ is the latter. As the easily decomposable water-soluble dietary fibers is preferable pullulan, gum arabic, pectin or a mixture of two or more of them.

Ratio of the hardly water-soluble dietary fibers to the readily water-soluble dietary fibers may be variable depending upon the type of constipation and is generally 2–30 parts by weight of readily water-soluble dietary fibers per part by weight of hardly water-soluble dietary fibers. If readily water-soluble dietary fibers are contained at a ratio of less than 2 parts by weight per part by weight of hardly water-soluble dietary fibers, increase in the amount of the microbial bodies and formation of the organic acids will be so poor such that no peristalsis-accelerating effects will be produced. If they are at a ratio of more than 30 parts by weight, increase in the amount of stools will not sufficiently be attained by combination of the increased amount of the microbial bodies and amount of the hardly water-soluble dietary fibers. When ratio of the hardly water-soluble dietary fibers to the readily water-soluble dietary fibers is within the above-defined range, the combination is effective in any type of constipation, colonic, proctosenous or mixed.

Such ratio corresponds to 2–45% by weight of readily water soluble dietary fibers and 1–40% by weight of hardly water-soluble dietary fibers based on the whole composition.

The food products of the invention may contain, as components other than the above-described dietary fibers, saccharides such as, for example, starch, dextrin and sucrose; proteins such as casein, soybean protein and egg white; minerals such as calcium carbonate and iron lactate; vitamins such as vitamins A, $B_1$, $B_2$, $B_{12}$ and C; rice, barley, wheat, soybean, corn, various vegetables, meats, dietary oils, seasonings, appropriately alone or in combination.

The food products are desirably formed into flakes, stew, rice gruel or wafers, although they may be in solution. The solution type products may be prepared in the form of dried pre-cooked food so as to be ready to eat only by adding of 2–3 parts by volume of boiling water to one part by volume of the product, stirring and subsequent standing for a few minutes.

The bowel movement-improving food products in flake form are prepared by adding to 50–80 parts of steam cooked cereal grains 5–25 parts of hardly water-soluble dietary fibers (containing 20% by weight or more of hemicellulose), 5–25 parts of readily water-soluble dietary fibers and, if desired, other dietary components and subjecting the mixture to compression crushing treatment. The cereal grains may be compression brushed and dried after addition of the above-mentioned dietary fiber and other components, or the dietary fibers may be attached to the cereal grains which have in advance been compression crushed.

As the other dietary components may be used saccharides such as, for example, starch, dextrin and sucrose, proteins such as casein, soybean protein and egg white, minerals such as calcium carbonate and iron lactate, vitamins such as vitamins A, $B_1$, $B_2$, $B_{12}$ and C and the like.

The bowel movement-improving food products in stew form are prepared first in granule by granulating readily water-soluble dietary fibers, hardly water-soluble dietary fibers, proteins, dietary oils in powder form, wheat, sodium bicarbonate, seasonings and "the dried ingredients" by means of a granulator.

As the protein are used casein, soybean protein, egg white and the like. Depending upon the nature of seasonings the granules can be formed into cream, "beef type" corn cream, stew or the like.

As "the dried ingredient" can be employed dried beef pieces, dried vegetable pieces or the like depending upon user's taste.

The granular product thus produced is readily formed into stew by adding, before eating, 2-3 volumes of hot water, stirring and 3 minutes standing.

The bowel movement-improving food products in rice gruel form are prepared in granule by mixing and granulating cereals such as rice, polished or unpolished, spray coated with an aqueous solution of readily water-soluble dietary fibers, and proteins such as casein, soybean protein and egg white, dietary oils in powder form, readily water-soluble dietary fibers, hardly water-soluble dietary fibers and seasonings by means of a granulator.

Depending upon the nature of seasonings, the granules can be formed into risotto, Japanese style rice gruel, rice and tea type, kasha or the like.

The granular product thus produced is readily formed into rice gruel by adding, before eating, 2-3 parts by volume of hot water at 100° C. to ore part by volume of the product, stirring the mixture and waiting for 3 minutes.

The bowel movement-improving food products in wafer form are prepared from the wafer sheets produced by blending and baking a mixture of 40-60 parts of wheat flour, 3-15 parts of hardly water-soluble dietary fibers, 3-15 parts of readily water-soluble dietary fibers and other food components in 100 parts of water by a conventional method and the cream produced by adding to 35-50 parts of oil or fat, 3-10 parts of hardly water-soluble dietary fibers and 10-40 parts of readily water-soluble dietary fibers and other food components to 100 parts in total. The cream (150-400 parts) is sandwiched in plural wafer sheets (100 parts) by a conventional method.

As in the above-described forms of the food product, a variety of dietary components may be added, for example, proteins such as casein, soybean protein and egg white, minerals and vitamins.

In cases where flakes or wafers are prepared, the ingestion can readily be made as a snack. In stew or rice gruel form, the ingestion in ordinary meal can be made alone or in combination with other foods.

It is noted that though the bowel movement-improving food products of the invention have been described with reference to the forms of flake, wafer, rice gruel and stew, they can be in any food form in addition to the above forms.

When a food product of the invention is taken in an amount of 50 g per meal, approximately 5-25 g of dietary fibers can be ingested. The amount of dietary fibers received by ordinary meal is in the range of 10 to 20 g per day with an average of 15.8 g per day and the amount of dietary fibers recommended for ingestion in constipation patients is 30 g/day. Thus, intake of a food product of the invention in an amount of 50 g per meal once a day will be sufficient to prevent or cure constipation.

Intake of the food products of the invention can improve all types of constipation by activating intestinal microorganisms, satisfactorily forming organic acids and increasing the amount of microbial bodies while leaving undigestible dietary fibers present in a sufficient amount.

Furthermore, as the food products of the invention contain hemicellulose, which inhibits absorption of cholesterol from ingested food into the body, they are also effective in the prevention of obesity.

The invention will be described in more detail below with reference to examples.

EXAMPLE 1

To 66 parts of rye which had in advance been steam cooked, washed with water, dehydrated, mealed and roughly compression crushed by rollers was added 70% aqueous solution of polydextrose (18 parts on solid basis) followed by addition of 6.9 parts of pectin, 3.4 parts of corn fibers and 6 parts of sodium casein. Then, the mixture was dried and simultaneously homogenized in a multi-stage continuous drier to a water content of about 20%. The dried homogenate was heated to approximately 85° C. and subsequently formed by compression crushing rollers into flakes. The flakes were further baked in an oven to remove moisture.

The rye flakes thus obtained contained 25 parts (18 parts + 6.9 parts) of readily water-soluble dietary fibers and 3.9 parts ($66 \times 0.015 + 3.4 \times 0.85$) of hardly water-soluble dietary fibers. As decomposition rate by intestinal microorganisms is 50% for polydextrose and 100% for pectine, dietary fibers utilizable by intestinal microorganisms were 15.9 parts ($18 \times 0.5 + 6.9$ parts), which corresponded to 55% of the entire amount of dietary fibers.

EXAMPLE 2

To 56 parts of corn grains which had in advance been steam cooked, washed with water, dehydrated, mealed and roughly compression crushed by rollers was added 70% aqueous solution of polydextrose (17 parts on solid basis) followed by addition of each 3 parts of guar gum and corn fibers and 18 parts of seasonings. Then, the mixture was dried and simultaneously homogenized in a multi-stage continuous drier to a water content of about 15%. The dried homogenate was heated to approximately 85° C. and subsequently formed by compression crushing rollers into flakes. The flakes were further baked in an oven to remove moisture.

The flakes thus obtained contained 30 g of dietary fibers per 100 g, of which 22 g was readily water-soluble dietary fibers and 8 g was hardly water-soluble dietary fibers. As decomposition rate by intestinal microorganisms in 50% for polydextrose and 100% for guar gum, dietary fibers utilizable by intestinal microorganisms were 14 g.

EXAMPLE 3

Rice gruel:

50 parts of pregelatinized rice was coated with 80 parts of polydextrose of neutral pH liquid type (polydextrose content of 35%) by means of a granulator. The pregelatinized rice was 78 parts by weight.

Separately, granules were prepared in a granulator from a mixture of 1.1 parts of pectin (pectin content of 90%), 1.2 parts of corn fibers (corn fiber contents of 85%), 4.6 parts of casein (casein content of 85%), 9 parts of powdery oil and 4.2 parts of seasonings.

The above-prepared coated rice, the above-prepared granules and 2 parts of "the dried ingredients" were mixed to prepare a pre-cooked rice gruel product.

The pre-cooked rice gruel product contained 30 g of dietary fibers per 100 g, of which 29 g was readily water-soluble dietary fibers and 1 g was hardly water-soluble dietary fibers.

As decomposition rate by intestinal microorganisms is 50% for polydextrose and 100% for pectin, dietary fibers utilizable by intestinal microorganisms were 15 g.

The rice gruel product thus prepared is stirred with three volumes of boiling water and then allowed to stand for approximately 3 minutes with cover to obtain rice gruel. The rice gruel can be risotto, Japanese-style rice gruel, rice and tea, kasha or the like depending upon the nature of seasonings.

EXAMPLE 4

Stew:

Granules were prepared from 28.45 parts of a milled mixture of 26 parts of polydextrose, 2.35 parts of corn fibers (corn fiber content of 85%), 2.2 parts of pectin (pectin content of 90%), 26 parts of powdery oil (oil content of 70%), 5 parts of casein (casein content of 85%), 13 parts of pregelatinized wheat and 15.45 parts of seasonings and 2 parts of sodium bicarbonate by means of a granulator. To the granules were added 8 parts of dried ingredients to prepare a stew product.

The product thus obtained is stirred with 2 volumes of boiling water to give a stew. The stew can be cream stew, beef stew, corn cream stew or the like depending upon the nature of seasonings.

It is noted that the above prepared product contained 30 g of dietary fibers per 100 g, of which 28 g was readily water soluble dietary fibers and 2 g was hardly water-soluble dietary fibers.

As decomposition rate by intestinal microorganisms is 50% for polydextrose and 100% for pectin, dietary fibers utilizable by intestinal microorganisms was 15 g.

EXAMPLE 5

Wafer:

A mixture of 65 parts of soft flour of wheat, 18 parts of corn fibers and 17 parts of sodium casein in 160 parts of water was kneaded and then baked in an iron closed vessel at 200°-300° C. to prepare wafer sheets. Separately, 12 parts of powdery sugar, 15 parts of guar gum and 30 parts of polydextrose were successively added to 43 parts of shortening followed by kneading to cream. The cream was applied to the wafer sheets. Wafer cake was prepared by sandwiching two layers of the cream in three sheets of the wafer sheet. A hundred grams of the wafer product thus prepared was composed of 50 g of the sheet portion and 50 g of the cream portion and contained 29 g of dietary fibers in total, of which 21 g was readily water-soluble dietary fibers and 8 g was hardly water-soluble dietary fibers.

As decomposition rate by intestinal microorganisms is 100% for guar gum and 50% for polydextrose, dietary fibers utilizable by intestinal microorganisms were 14 g.

TEST EXAMPLE 1

In order to demonstrate the advantageous effect of the bowel movement-improving food products of the invention prepared in the examples, 10 persons (including 5 constipated patients) were given the flaked product prepared according to Example 1 (50 g/day) for 2 weeks. As a result, all of the persons had softer stools and felt easier defecation as compared with those before test. Frequency of defecation increased in 6 of the 10.

TEST EXAMPLE 2

Seven person suffering from chronic constipation received a flaked food product incorporating hardly water-soluble dietary fibers only (25 parts of corn fibers) for 10 days (50 g/day) ("Period 1"), then were deprived of receiving the flaked food product for a week ("Period 2") and subsequently received the flaked food product prepared according to Example 1 for 10 days ("Period 3").

No improvement in bowel movement was observed in 3 of the 7 in "Period 1", but bowel movement was improved in 2 of the 3 in "Period 3".

It was demonstrated by Test Examples 1 and 2 that the food product of the invention comprising a combination of hardly water-soluble dietary fibers (containing 20% by weight or more of hemicellulose) and readily water-soluble dietary fibers are effective for improvement of the bowel movement.

Industrial Applicability

The food products of the invention are useful as a bowel movement-improving food and are of use in medical industry and food industry.

What is claimed is:

1. A bowel movement-improving food product containing 10-50% by weight of dietary fibers based upon the whole product, wherein said dietary fibers comprise 2-30 parts by weight of a mixture of polydextrose and pectin per part by weight of corn fibers, and wherein said mixture is comprised of ½ to ¾ polydextrose and ½ to ¼ pectin.

2. A bowel movement-improving food product according to claim 1 wherein the product is in flake form.

3. A bowel movement-improving food product according to claim 1 wherein the product is in stew form.

4. A bowel movement-improving food product according to claim 1 wherein the product is in rice gruel form.

5. A bowel movement-improving food product according to claim 1 wherein the product is in wafer form.

6. A method for improving bowel movement which comprises administering to a patient the bowel movement-improving food product according to claim 1 at a daily dose of 5-25 g in adults in terms of the total amount of dietary fibers.

* * * * *